No. 721,739. PATENTED MAR. 3, 1903.
M. E. PORTER.
BICYCLE GEARING.
APPLICATION FILED JULY 23, 1902.
NO MODEL.
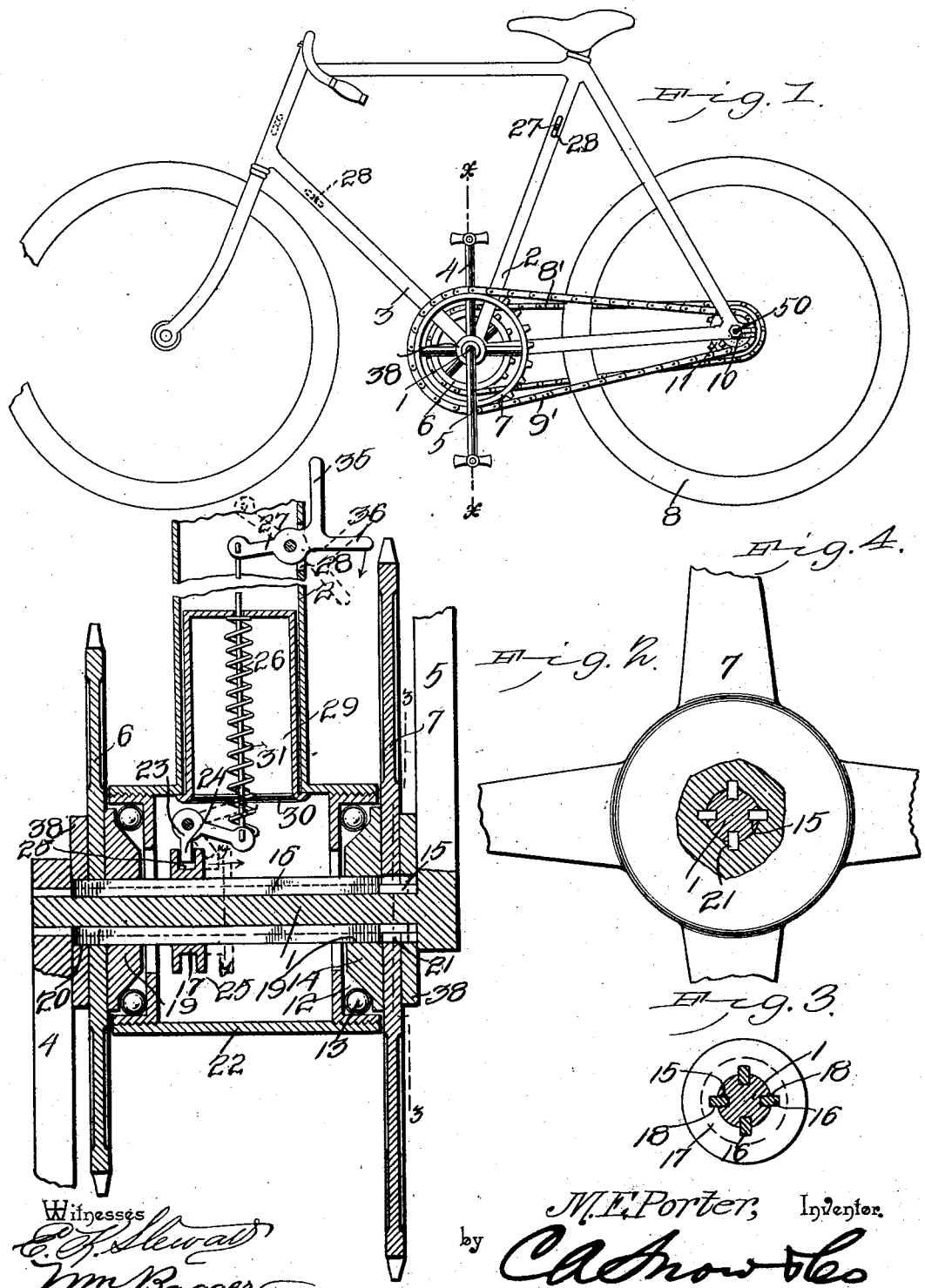

UNITED STATES PATENT OFFICE.

MOSES ENSIGN PORTER, OF RIVERSIDE, UTAH.

BICYCLE-GEARING.

SPECIFICATION forming part of Letters Patent No. 721,739, dated March 3, 1903.

Application filed July 23, 1902. Serial No. 116,715. (No model.)

*To all whom it may concern:*

Be it known that I, MOSES ENSIGN PORTER, a citizen of the United States, residing at Riverside, in the county of Boxelder and State of Utah, have invented a new and useful Bicycle-Gearing, of which the following is a specification.

This invention relates to bicycle-gearing; and it has for its object to provide a device by means of which a bicycle may be geared to variable speed and by means of which the speed may be instantaneously changed by simply operating a lever disposed in a position convenient to the rider.

The invention consists in the improved construction, arrangement, and combination of parts whereby a device having the qualifications above referred to shall be produced which shall possess superior advantages in point of simplicity, durability, and general efficiency, all as will be hereinafter fully described, and particularly pointed out in the claims.

In the accompanying drawings, Figure 1 is a side elevation of a bicycle having my improvement applied thereto and showing in dotted lines how the position of the operating-lever may be changed. Fig. 2 is an enlarged sectional view, taken vertically through the crank-shaft, of a bicycle constructed in accordance with my invention and related parts on the line $x\ x$ in Fig. 1. Fig. 3 is a transverse sectional view taken on the line $y\ y$ in Fig. 2. Fig. 4 is a sectional detail view taken on the line $z\ z$ in Fig. 2.

Corresponding parts in the several figures are indicated by like characters of reference.

1 designates the crank-shaft of a bicycle, which is supported in the usual manner in the bearing formed at the convergence of the tubes 2 and 3. At the end of the shaft 1 are the cranks 4 and 5, which may be either formed integrally with said shaft, or they may be made separably and secured thereon in the usual manner. In Fig. 2 of the accompanying drawings an example of each form has been shown. The shaft 1 supports a pair of sprocket-wheels 6 and 7, which are of different diameters and which are connected by means of the chains 8' and 9' with sprocket-wheels upon the axle of the hind wheel 8, said sprocket-wheels upon the hind axle 50, and which are designated 10 11, being likewise of different diameters. The large wheel 7 upon the crank-shaft 1 is connected with the small sprocket-wheel upon the hind axle, and the large sprocket-wheel upon the hind axle is connected with the small sprocket-wheel upon the main axle or crank-shaft. Ball-races 12 are provided to accommodate the balls 13, which form bearings for the cones 14 upon the crank-shaft 1. All these parts are of the usual or any well-known construction.

The crank-shaft 1 is provided with a series of parallel longitudinal grooves 15, extending through its entire length or through as much of its length as is included between the sprocket-wheels 6 7, the thickness of said sprocket-wheels included. Any desired number of these grooves 15 may be formed in the crank-shaft. Usually four will be the number used, as shown in the accompanying drawings.

16 16 designate a series of keys or ribs which are mounted slidingly in the grooves 15 and which are rigidly connected with a collar 17, mounted exteriorly upon the crank-shaft and having in its inner periphery a series of notches 18, in which the said ribs or keys 16 are securely mounted. It will be seen that by means of the collar 17 the ribs or keys 16 may be moved in unison longitudinally upon the shaft with which they revolve, carrying with them the collar 17. The cones 14 and the sprocket-wheels 6 and 7 are provided at their inner peripheries with notches (designated, respectively, 19, 20, and 21) to admit the ribs or keys 16. The latter, however, are of such a length that they may engage only one of the sprocket-wheels at any one time.

Within the casing 22, which forms the bearing for the crank-shaft 1, is fulcrumed a bell-crank lever 23, one arm of which 24 engages an annular groove 25 in the collar 17. The other arm of the said bell-crank lever is connected by a rod or wire 26 with one end of a lever 27, which is fulcrumed in a slot 28 in either one of the bicycle-tubes 2 or 3. In the accompanying drawings this lever 27, which is the operating-lever, has been shown as mounted in the tube 2, which supports the seat; but, if preferred, it may with equal facility be arranged in the front tube 3, which is more convenient to the handle-bars. The operating-lever 27 being constructed as shown and fulcrumed in the tube projects no appreciable distance through the slot 28, and hence is out of the way of the rider. In the lower end of the tube—in the present instance 2—in which the operating-lever is pivoted is mounted a cap 29, having at its lower edge a flange 30, which prevents the said cap from moving upwardly in the tube. A spring 31, coiled upon the connecting-wire 26 between the top of the said cap and the lever 23, retains the latter automatically in the position shown in Fig. 1 of the drawings, whereby the collar 17 holds the keys or ribs 16 in engagement with the sprocket-wheel 6. To reverse the position and cause the ribs 16 to engage the notches 21 of the sprocket-wheel 7, it is only necessary to depress the projecting arm of the lever 28, thus throwing the inner end of said lever in an upward direction and past the center, as shown in dotted lines in Fig. 2. The bell-crank lever 23 will thus be actuated to move the collar 17 slidingly upon the crank-shaft, carrying with it the ribs or keys 16, which are thus released from their connection with the sprocket-wheel 6 and caused to engage the sprocket-wheel 7, which is thus locked upon the shaft. The cap 29 strengthens the tube to which it is applied and affords supporting means for the spring 31, whereby the pull exerted thereon is in a straight upward direction. This operation of changing the gear may be performed at any time while the wheel is in motion and by the simple pressure of the finger of the rider upon one of the projecting arms of the lever 27. Two such arms 35 36 have been shown located substantially at right angles to each other, so that one of said arms will always lie in contact with the tube.

As will be seen from the foregoing description, my improved bicycle-gearing is extremely simple in construction and admits of a practically instantaneous change of speed. The relative sides of the sprocket-wheels may be adjusted to suit any individual requirements.

It should be stated that I prefer to arrange washer-plates, as 38, upon the crank-shaft 1 adjacent to the outer sides of the sprocket-wheel 6 in order to prevent the latter from vibrating or wabbling.

Having thus described my invention, I claim and desire to secure by Letters Patent of the United States—

1. In a device of the class described, a longitudinally-grooved crank-shaft, sprocket-wheels mounted loosely thereon and having notches corresponding with the grooves therein, keys mounted slidably in said grooves and adapted to engage the notches of the sprocket-wheels, an annularly-grooved collar having rigid connection with said keys, a bell-crank lever having one arm in engagement with the annular groove of said collar, connecting means between the other arm of said bell-crank lever and an operating-lever fulcrumed in the bicycle-tube, and means for retaining the annularly-grooved collar and its related parts at the proper points of adjustment, substantially as set forth.

2. In a device of the class described, the combination with the slidable keys engaging grooves in the crank-shaft and adapted to engage notches in the sprocket-wheels mounted upon said crank-shaft, of an annularly-grooved collar having rigid connection with said keys, a bell-crank lever engaging the annular groove in said collar, a cap mounted in the bicycle-tubing above said bell-crank lever, a spring coiled within said cap and bearing upon one arm of said bell-crank lever to hold the latter at one end of its throw, and connecting means between said bell-crank lever and a lever mounted in a slot in the tubing whereby the said bell-crank lever may be operated against the tension of the spring, substantially as set forth.

3. In a device of the class described, the combination of the longitudinally-grooved crank-shaft, the sprocket-wheels mounted thereon and having notches corresponding with the grooves therein, the slidable keys, an annularly-grooved collar connecting said keys, a spring-actuated bell-crank lever engaging said annularly-grooved collar, an operating-lever mounted in a slot in the bicycle-tube and having two projecting arms whereby it may be manipulated, one of said arms being at all times in contact with the bicycle-tubing, and connecting means between the inner arm of said operating-lever and the spring-actuated bell-crank lever, substantially as set forth.

In testimony that I claim the foregoing as my own I have hereto affixed my signature in the presence of two witnesses.

MOSES ENSIGN PORTER.

Witnesses:
NAOMI GLEASON,
MEADY M. GLEASON.